United States Patent
Readman

[11] 3,903,924
[45] Sept. 9, 1975

[54] COMPARTMENTED FUEL TANK
[75] Inventor: John Readman, Rockford, Ill.
[73] Assignee: Sundstrand Corporation, Rockford, Ill.
[22] Filed: July 23, 1973
[21] Appl. No.: 381,725

[52] U.S. Cl. .............. 137/574; 244/135 R
[51] Int. Cl.² .............................. B64D 37/00
[58] Field of Search .......... 137/571, 573, 574, 575, 137/576, 265; 244/135 R; 220/20.5, 22; 280/5 R, 5 A; 55/159

[56] References Cited
UNITED STATES PATENTS

| | | | |
|---|---|---|---|
| 1,052,963 | 2/1913 | Reid | 137/573 |
| 1,219,115 | 3/1917 | Laurenti | 137/575 X |
| 2,316,729 | 4/1943 | Tryon | 137/573 X |
| 2,703,607 | 3/1955 | Simmonds | 137/575 X |
| 3,486,302 | 12/1969 | Paynter | 55/159 |
| 3,608,871 | 9/1971 | Harsanyi et al. | 137/571 X |
| 3,642,086 | 2/1972 | Andrews | 220/22 X |

Primary Examiner—William R. Cline
Attorney, Agent, or Firm—Wegner, Stellman, McCord, Wiles & Wood

[57] ABSTRACT

A compartmented fuel tank comprising a container having a generally triangular cross section which is relatively wide at the top and relatively narrow at the bottom, a plurality of transverse walls in the container, dividing the container into a plurality of successive compartments, an outlet communicating with the bottom of the last compartment at the rear of the container for discharging fuel, an inlet communicating with the top of the compartment at the front of the container for supplying gas to pressurize the container, a tube extending through each of the transverse walls from the bottom of the preceding compartment to the top of the succeeding compartment, and a closed tubular screen in the last compartment having a fine mesh for passing liquid fuel while excluding gas bubbles and having an interior communicating with the outlet.

8 Claims, 5 Drawing Figures

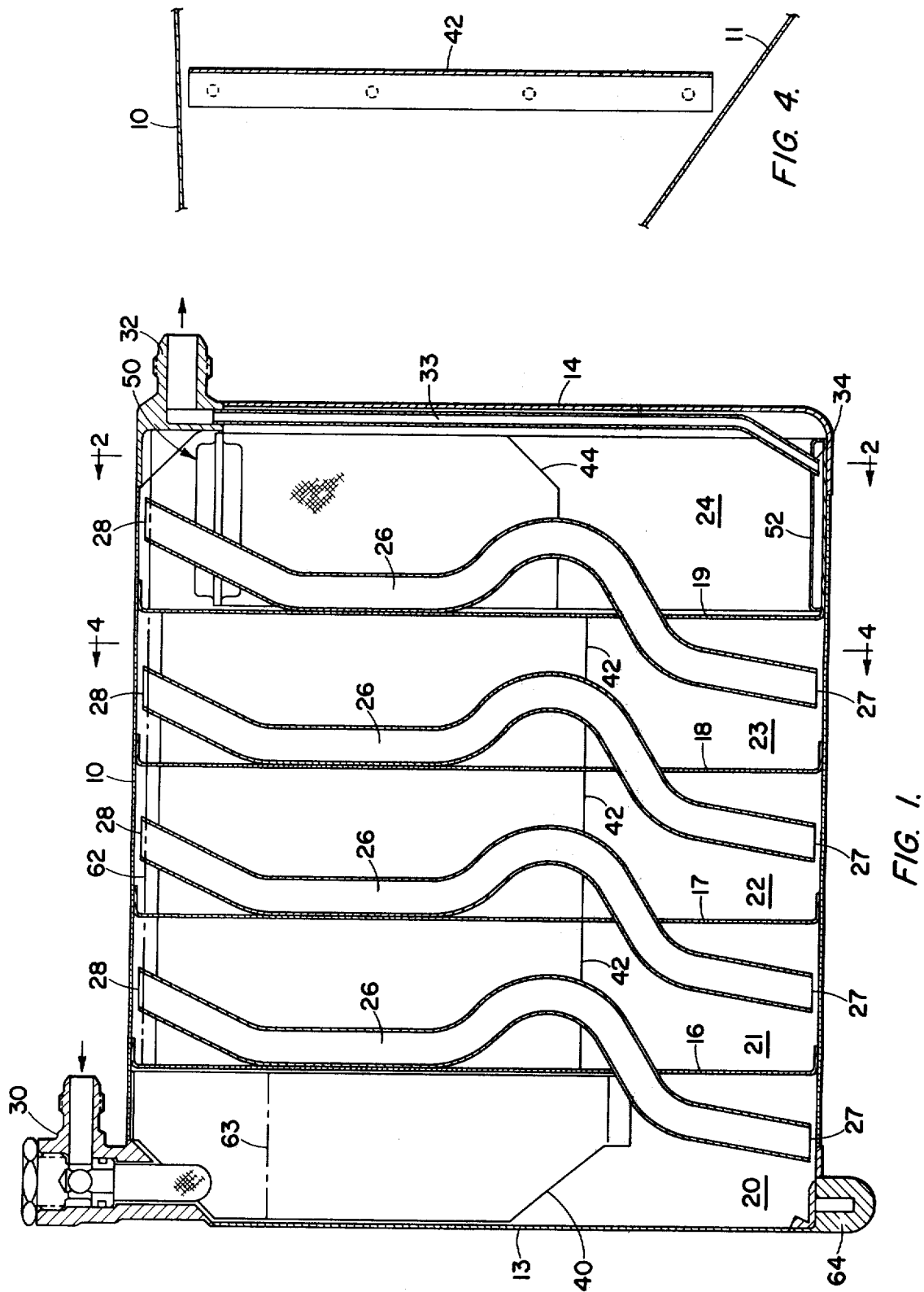

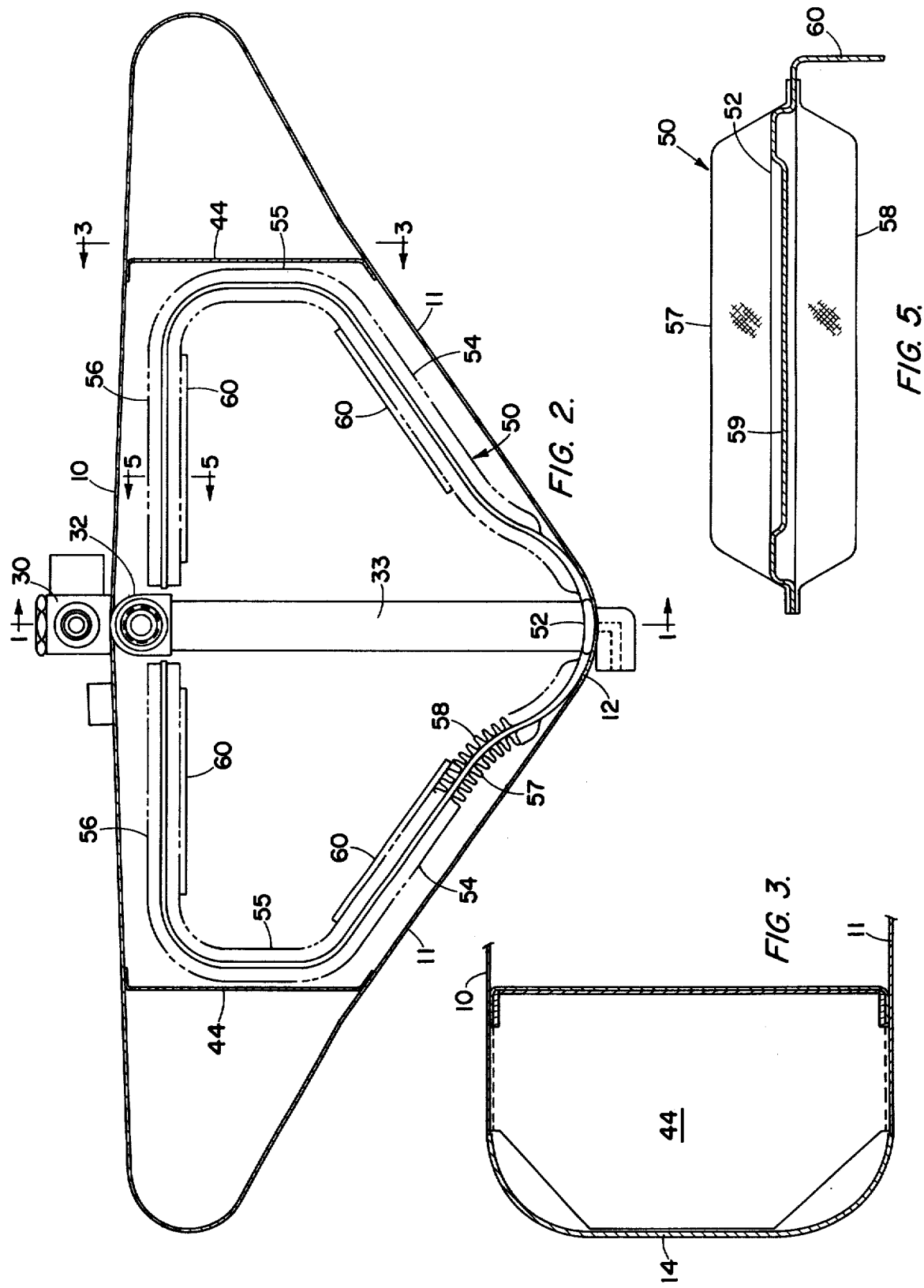

3,903,924

COMPARTMENTED FUEL TANK

BACKGROUND OF THE INVENTION

In modern aircraft, it is conventional to provide a hydraulic power supply which includes a pump for delivering fluid under pressure to operate various auxiliary systems. It has been customary to drive the hydraulic pump by power derived in one way or another from the main aircraft engines. For example, in some arrangements, the hydraulic pump is driven by means of an air turbine operated by air which is bled from an air supply associated with jet engines. Reliable operation of the pump is obtained in such arrangements as long as the main engines operate satisfactorily. In event of failure of the main engines, it is desirable to provide for emergency hydraulic power to operate the auxiliary systems, such as airfoil surfaces, sufficiently to safely manipulate the aircraft to a controlled landing, in preference to loss of all steering ability. Prior U.S. Pat. Nos. 3,660,977 and 3,722,217 relate to auxiliary systems for driving a hydraulic pump for a limited period of time to provide fluid under pressure for an emergency landing. In the auxiliary systems of the prior patents, it is typical to utilize a hotgas turbine for driving the hydraulic pump, in association with a decomposition chamber utilizing a monofuel to provide hot gas for driving the turbine. The present invention relates to a fuel storage tank for use in an emergency hydraulic supply system of the type described.

SUMMARY OF THE INVENTION

In a preferred embodiment, a fuel tank embodying the principles of the present invention comprises a withoutmoving-parts container which is divided into a plurality of compartments which minimize sloshing, control the monofuel level, control the ullage volume position and permit operation under negative gravity conditions and in all attitudes.

It is a general object to provide a new and improved compartmented fuel tank comprising a container having an outlet for fuel flow and an inlet for admitting gas to force the fuel out, at least one partition in the container between the inlet and the outlet, dividing the container into separate compartments, and a tube connecting the compartments for conducting fuel from the inlet to the outlet.

A more specific object is to provide a compartmented fuel tank of the type described including a container having a relatively wide upper portion and a relatively narrow bottom portion, in which there are a plurality of successive compartments from front to rear in the container, with an outlet communicating with the bottom of a compartment at the rear for discharging fuel, an inlet communicating with the top of the compartment at the front of the container for supplying gas to pressurize the container, and a tube extending through each of the compartment walls from the bottom of the preceding compartment to the top of the succeeding compartment.

Preferably, each of the compartments in the fuel tank includes vertical baffles which control the sloshing of fuel within each of the compartments.

As illustrated herein, the last compartment includes a closed tubular screen having a fine mesh for passing liquid while excluding gas bubbles and having an interior communicating with the outlet. Under negative and zero gravity conditions, the fuel within the screen provides uninterrupted fuel flow to the outlet for limited periods of time dependent upon the specific compartment and screen geometry.

BRIEF DESCRIPTION OF THE DRAWINGS

FIG. 1 is a longitudinal vertical sectional view through a compartmented fuel tank embodying the principles of the present invention;

FIG. 2 is an end elevational view taken at about the line 2—2 of FIG. 1, with the rear end cover removed;

FIG. 3 is a fragmentary sectional view, taken at about the line 3—3 of FIG. 2, illustrating a baffle in the last compartment in the fuel tank, FIG. 4 is a fragmentary cross-sectional view, taken at about the line 4—4 of FIG. 1, illustrating a baffle in the next to last compartment in the fuel tank; and FIG. 5 is a sectional view through a tubular screen filter, taken at about the line 5—5 of FIG. 2.

DETAILED DESCRIPTION OF PREFERRED EMBODIMENT

Referring now to the drawings in more detail, a tank embodying the principles of the present invention includes a generally horizontally disposed top wall 10, as best seen in FIG. 2. At opposite side edges of the top wall 10, it has a rounded juncture with inclined side walls 11 which extend downwardly and inwardly toward a juncture with each other which provides a bottom 12 in the container which is relatively narrow when compared with the relatively wide top wall 10. At opposite ends of the top wall 10 and the side walls 11, the container is closed by a front end wall 13 and a rear end wall 14. The walls 10, 11, 13 and 14 are appropriately connected together in a manner to provide a sealed fluid-tight container adequate for storage of monofuel in liquid form.

The container includes a plurality of transverse walls 16, 17, 18 and 19 which divide the interior of the container into a plurality of separate successive compartments 20, 21, 22, 23 and 24. Communication between the successive compartments is provided solely by means of tubes 26, one of which extends in fluid-tight relation through each of the walls 16, 17, 18 and 19. Each of the tubes 26 includes a lower end portion 27 which is located centrally in the bottom of the preceding compartment, and an upper end portion 28 which is located centrally in the top of the succeeding compartment. The tubes 26 are preferably curved adjacent the passage through the compartment walls in a manner to permit smooth, unobstructed flow through the tubes while enabling appropriate mounting.

In a preferred use of the tank, the various compartments are substantially filled with liquid monofuel, and the interior of the tank is pressurized through an inlet fitting 30 which, as illustrated, is located centrally in the top of the first compartment 30. The tank may be pressurized with gas such as nitrogen supplied through the fitting 30 at a pressure on the order of 50 to 60 psi, for example, to force the fuel through the successive compartments and outwardly through an outlet fitting 32 which, as illustrated, is located centrally in an upper portion of end wall 14. The outlet fitting 32 communicates with a tubular conduit 33 of rectangular cross section which has a lower end portion 34 located centrally at the bottom of the last compartment 24.

In order to control sloshing in the individual compartments, each of the compartments is provided with a pair of vertically disposed baffles extending in a front-to-rear direction in the tank and located between the center of the tank and the sides of the tank. In the compartment 20, one of the baffles is visible at 40 (FIG. 1). In the compartments 21, 22 and 23, the baffles are similar and are visible at 42 in FIGS. 1 and 4. In the compartment 24, the baffles are designated 44, and are visible in FIGS. 1, 2 and 3. The baffles 40, 42 and 44 restrict lateral motion of the monofuel in the individual compartments while permitting flow from the upper portions of each compartment to the lower portion in each compartment.

In order to provide for uninterrupted flow of liquid fuel without significant gas entrained therein in the event of operation of the aircraft during limited periods of time when the tank is subjected to negative or zero gravity conditions, the last compartment 24 in the tank is provided with a closed tubular screen generally designated 50, constructed of a fine wire mesh suitable for passing liquid fuel while excluding gas bubbles. The interior of the tubular screen communicates with the inlet 34 to the outlet tube 33 leading to outlet fitting 32. In an embodiment illustrated herein, the tubular screen 50 includes a central lower portion 52, upwardly and outwardly extending inclined portions 54 adjacent the side walls 11, vertically extending side portions 55 adjacent to the baffle 44, and inwardly extending upper portions 56 adjacent the top wall 10. The tubular screen is formed by mutually facing channel-shaped screen members 57 and 58 which are appropriately joined to each other, and which are both corrugated as seen in FIG. 2, except in the vicinity of the central lower portion 52. At appropriate locations along the length of the tubular screen 50, there are screen support plates as at 59 disposed between the opposed channels 57 and 58, each including an extension as at 60 suitable for mounting on the compartment wall 19 in a manner to support the screen in the position illustrated in FIG. 2.

In operation, the fuel tank is preferably backfilled through the outlet 32 with liquid monofuel which successively fills the compartments 24, 23, 22, 21 and 20. Normally, the compartments 21, 22, 23 and 24 are filled substantially to the top of the container as illustrated at the level 62. The compartment 20 is normally filled to a slightly lower level 63 to provide adequate expansion volume. Preferably, a fill gauge (not shown) is associated with the compartment 20 to indicate when the tank is appropriately filled. It is usually desirable to utilize a temperature gauge in a fitting 64 in the bottom of compartment 20 in association with the fill gauge. When it is necessary to utilize the fluid in the tank for operation of the emergency power supply system, during positive gravity conditions gas under pressure is supplied through the inlet fitting 30, and the pressure forces the fuel from a compartment 20 through the tube 26 into the compartment 21, and in turn such displacement of fuel forces fuel flow through the outlet fitting 32. As the fuel is utilized, and preceding compartments are emptied, sloshing of fuel in the tank is controlled by containment of the remaining fuel in succeeding compartments.

During periods of operation under negative or zero gravity conditions, as where the aircraft drops uncontrolled in an air pocket, and fuel rises to the top of the separate compartments in a manner to admit gas to the lower ends of the tubes 26, the fuel contained within the tubular screen 50 provides for uninterrupted fuel flow without significant gas content to the outlet 32 for limited periods of time on the order of 15 seconds depending on specific compartment and screen geometry. The screen 50 strains out gas bubbles because the surface tension of the bubble is greater than the differential pressure of the fuel as it flows through the screen. On return to positive gravity conditions after 15 seconds of negative gravity operation, a sufficient level of fuel is retained in the last compartment to allow for appropriate fuel flow requirements for all other flight attitudes during positive gravity conditions.

I claim:

1. A compartmented fuel tank, comprising,
   a. a container having a longitudinal axis and a cross section transverse to the longitudinal axis which is relatively wide at the top and relatively narrow at the bottom,
   b. an outlet communicating with the bottom of the container at one end for discharging fuel,
   c. an inlet communicating with the top of the container at the opposite end for supplying gas to pressurize the container,
   d. a plurality of transverse walls in the container dividing the container into a plurality of separate successive sealed compartments between the inlet and the outlet, and
   e. a plurality of tubes each having a diameter approximating that of the outlet for substantial fuel flow therethrough with one of said tubes extending through each of said transverse walls from the bottom of the preceding compartment to the top of the succeeding compartment and providing the sole communication between compartments.

2. A compartmented fuel tank as defined in claim 1, including
   a closed tubular screen in the last compartment having a fine mesh for passing liquid fuel while excluding gas bubbles and having an interior communicating with the outlet.

3. A compartmented fuel tank as defined in claim 2, wherein
   the tubular screen includes a bottom portion communicating with the outlet and side portions extending outwardly and upwardly.

4. A compartmented fuel tank as defined in claim 2, wherein
   the outlet comprises a tube communicating with the interior of the tubular screen in the bottom of the last compartment and extending upwardly to the top of the container.

5. A compartmented monofuel tank for an aircraft emergency hydraulic power supply system, comprising,
   a. a container having a generally horizontal top wall, inclined side walls extending downwardly from opposite sides of the top wall to a juncture with each other to form the bottom of the container, and triangular front and rear end walls joined to the top and side walls,
   b. a plurality of parallel spaced transverse walls in the container between the opposed end walls dividing the container into a plurality of successive compartments,
   c. an outlet leading from the bottom of the compartment at the rear end of the container for discharging fuel, d. an inlet leading to the top of the compartment at the front end of the container for admitting pressurizing gas, e. a tube extending through each of said transverse walls from the bottom of a preceding compartment to the top of a succeeding compartment and providing the sole communication between compartments, and f. a closed tubular screen in the last compartment having a fine mesh for passing liquid fuel while excluding gas bubbles and having an interior communicating with the outlet, said tubular screen including a bottom portion communicating with the outlet, side portions extending upwardly and outwardly along the container side walls, vertically disposed portions, and horizontal top portions extending toward the center of the container adjacent the top walls.

6. A compartmented tank as defined in claim 5, wherein the outlet comprises a tube communicating with the interior of the tubular screen in the bottom of the last compartment and extending upwardly to the top of the container.

7. A compartmented fuel tank, comprising, a. a container having a pair of end walls, b. at least one transverse wall in the container dividing the container into a plurality of successive sealed compartments, c. an outlet with an entry end leading from the bottom of a compartment adjacent an end wall of the container for discharging fuel, d. an inlet leading to the top of the comparmtent adjacent the other end wall of the container for admitting pressurizing gas, e. a tube extending through said transverse wall from the bottom of a preceding compartment to the top of a succeeding compartment and providing the sole communication between compartments, and f. a closed tubular screen in the last compartment having a fine mesh for passing liquid fuel while excluding gas bubbles and having an interior communicating with the entry end of the outlet.

8. A compartmented fuel tank as defined in claim 7 wherein said closed tubular screen extends for a major part of the height of said last compartment.

* * * * *